United States Patent
Lee et al.

(10) Patent No.: US 7,394,983 B2
(45) Date of Patent: Jul. 1, 2008

(54) METHOD AND APPARATUS FOR DETECTING OPTICAL SWITCH FAULT BY MONITORING OPTICAL OUTPUT TRANSITIONS

(75) Inventors: Wang-joo Lee, Daejeon (KR); Kwang-joon Kim, Daejeon (KR); Sung-hoon Kwak, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 631 days.

(21) Appl. No.: 10/685,795

(22) Filed: Oct. 14, 2003

(65) Prior Publication Data

US 2004/0101233 A1 May 27, 2004

(30) Foreign Application Priority Data

Oct. 24, 2002 (KR) .................. 10-2002-0065175

(51) Int. Cl.
*H04J 14/00* (2006.01)
(52) U.S. Cl. .................. 398/45; 398/46; 398/52
(58) Field of Classification Search ............. 398/10–12, 398/16–19, 45–46, 50–54
See application file for complete search history.

(56) References Cited

U.S. PATENT DOCUMENTS 6,101,010 A * 8/2000 Konishi .................. 398/14
6,243,507 B1 * 6/2001 Goldstein et al. .............. 385/13
6,980,736 B1 * 12/2005 Fee et al. .................. 398/19

FOREIGN PATENT DOCUMENTS

KR 2000-0065349 11/2000

OTHER PUBLICATIONS

Electronics Letters, Aug. 19, 1999, vol. 35, No. 17, pp. 1481-1483.

* cited by examiner

*Primary Examiner*—Dzung D Tran
(74) *Attorney, Agent, or Firm*—Blakely, Sokoloff, Taylor & Zafman LLP

(57) ABSTRACT

Provided are a method and an apparatus for detecting the fault of an optical switch. The apparatus includes an optical monitoring signal generator, a coupler, a splitter, a plurality of optical detecting and output power transition sensing units, and a fault determiner. The optical monitoring signal generator generates optical monitoring signals having different wavelengths from optical signals including data to be transmitted. The coupler optically couples the optical monitoring signals to the optical signals including data to be transmitted and inputs the coupled optical signals to an optical switch. The splitter splits the optical monitoring signals from optical signals output from the optical switch. The plurality of optical detecting and output power transition sensing units detect output power transitions of the split optical monitoring signals. The fault determiner receives information on setting the optical switch from an external source, compares the information with the detected output power transitions of the split optical monitoring signals, and determines whether the optical switch malfunctions depending on whether the information coincides with the detected output power transitions of the split optical monitoring signals.

4 Claims, 8 Drawing Sheets

METHOD AND APPARATUS FOR DETECTING OPTICAL SWITCH FAULT BY MONITORING OPTICAL OUTPUT TRANSITIONS

BACKGROUND OF THE INVENTION

This application claims the priority of Korean Patent Application No. 2002-65175 filed on Oct. 24, 2002 in the Korean Intellectual Property Office, the disclosure of which is incorporated herein in its entirety by reference.

1. Field of the Invention

The present invention relates to a method and an apparatus for detecting the fault of an optical switch, and more particularly, to a method and an apparatus for determining whether an optical switch malfunctions by detecting output power transitions of optical monitoring=signals from output ports of the optical switch.

2. Description of the Related Art

Conventional arts methods for monitoring the fault of an optical switch include the steps of: applying different frequency tones in a frequency band of several kHz to several tens of kHz to each of the optical signals to be transmitted to input ports of the optical switch, splitting a portion of optical signals output from output ports of the optical switch, detecting tone information from the split portion of optical signals, comparing the detected tone information with switch configuration information, and determining whether the optical switch malfunctions. Here, the applying of frequency tone indicates sinusoidal amplitude modulation of input optical signal with a specific frequency using a low modulation coefficient within a range of 5% to minimize the bad influence on reception sensitivity.

A tone usually represents the pitch of voices of human beings or sound of musical instruments and refers to a constant frequency for a predetermined period of time. For example, the keys of a piano have their own tones.

In the field of present optical communications optical carriers with center frequency of more than 100 THz are on/off modulated within tens of GHz. These optical signals have frequency components of center frequency and the harmonics of on/off modulation frequency.

As described above, the tone applied optical signal contains an additional frequency (tone) component. Optical signals containing different tones may be applied to an optical switch, pass through switching channels, and portions of them are detected from output ports. In the prior art of tone applying, low frequency amplitude modulation is performed so that the amplitude of an optical signal is slightly fluctuated at that frequency. Here, actual information to be transmitted is transmitted with an amplitude-modulated portion of several tens of MHz to several GHz of the optical signal The above-described prior art method can directly detect whether an optical switch malfunctions regardless of the type of switches. However, when applied tone components remain in an optical signal, which has passed through an optical system containing the optical switch such as an optical cross-connector (OXC), the fault detecting method using a tone cannot be applied to a next OXC. Also, the remaining tone components increase a transmission error rate in a final reception port. Thus, a complicated optical module has to be added to remove the used tone components after detecting the tones from all optical signals before the next optical switch. Even in this case, the quality deterioration of the optical signal cannot be completely prevented.

SUMMARY OF THE INVENTION

The present invention provides a method and an apparatus for determining whether an optical switch malfunctions by detecting power transitions of optical monitoring signals from output ports of the optical switch and comparing information on the transitions of the optical monitoring signals with switch control information from an external unit.

The present invention also provides a method for determining whether an optical switch malfunctions without affecting the quality of the optical signal compared with a method of applying, detecting, and removing a tone by coupling optical monitoring signals to optical signals input to the optical switch, splitting the optical monitoring signals from the coupled optical signals output from the optical switch, and detecting output power transitions of the optical monitoring signals.

According to an aspect of the present invention, there is provided an apparatus for detecting a fault of an optical switch including an optical monitoring signal generator, a coupler, a splitter, a plurality of optical detecting and output power transition sensing units, and a fault determiner. The optical monitoring signal generator generates optical monitoring signals having different wavelengths from optical signals including data to be transmitted. The coupler optically couples the optical monitoring signals to the optical signals including data to be transmitted and inputs the coupled optical signals to an optical switch. The splitter splits the optical monitoring signals from optical signals output from the optical switch. The plurality of optical detecting and output power transition sensing units detect output power transitions of the split optical monitoring signals. The fault determiner receives information on settings of the optical switch from an external source, compares the information with the detected output power transitions of the split optical monitoring signals, and determines whether the optical switch malfunctions depending on whether the information coincides with the detected output power transitions of the split optical monitoring signals.

According to another aspect of the present invention, there is also provided a method of detecting a fault of an optical switch. Optical monitoring signals having different wavelengths from optical signals including data to be transmitted are generated. The optical monitoring signals are optically coupled to the optical signals with data to be transmitted and the coupled optical signals are input to an optical switch. The optical monitoring signals are split from optical signals output from the optical switch and output transitions of the split optical monitoring signals are detected. Information on setting the optical switch is received from an external source, the information is compared with the detected output power transitions of the split optical monitoring signals, and it is determined whether the optical switch malfunctions depending on whether the switching information coincides with the detected output power transitions of the split optical monitoring signals.

According to still another aspect of the present invention, there is also provided an apparatus for detecting a fault of an optical switch. The apparatus includes a splitter, a plurality of optical detecting and output power transition sensing units, and a fault determiner. The splitter splits a plurality of optical signals output from an optical switch. The plurality of optical detecting and output power transition sensing units detect output power transitions of the split optical signals. The fault determiner receives information on the optical switch setting from an external source, compares the information with the detected output power transitions of the split optical signals, and determines whether the optical switch malfunctions depending on whether the information coincides with the detected output transitions of the split optical signals.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, a preferred embodiment of the present invention will be described in detail with reference to the attached drawings.

Figure 1:
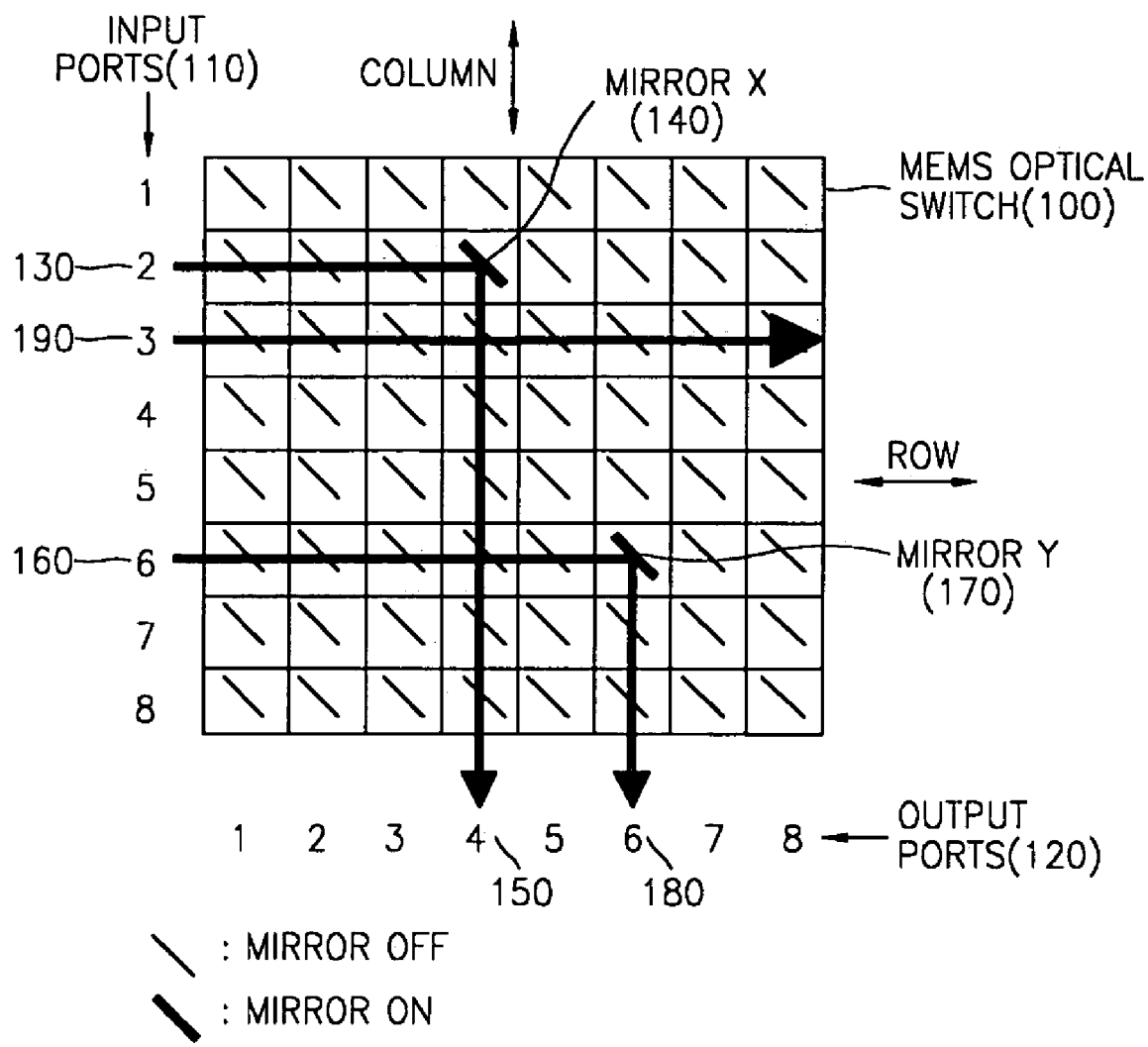
FIG. 1 is a view explaining the principle of optical switching carried out in an optical switch having an N×N matrix form.

FIG. 1 is a view explaining the principle of optical switching carried out in an optical switch having an N×N matrix form. Referring to FIG. 1, the principle of optical switching performed in an 8×8 micro-electro-mechanical system (MEMS) switch 100, which is one of optical switches processing a large amount of input data, will be described. The 8×8 MEMS switch 100 has eight input ports 110, eight output ports 120, and eight mirrors in each column and each row, which accounts to a total of 64 mirrors. Optical signals input to the input ports 110 are reflected by any one of eight mirrors in an on state in a row corresponding to each of the input ports 110 and output via the output ports 120.

For example, an optical signal input to the number 2 input port 130 is reflected by a mirror X(140) in an on state and output to the number 4 output port 150. An optical signal input to the number 6 input port 160 is reflected by a mirror Y(170) in an on state and output to the number 6 output port 180. Since the number 3 input port 190 has no mirrors in an on state in the corresponding row, an optical signal input to the number 3 input port 190 is not reflected and not output.

Figure 2A:
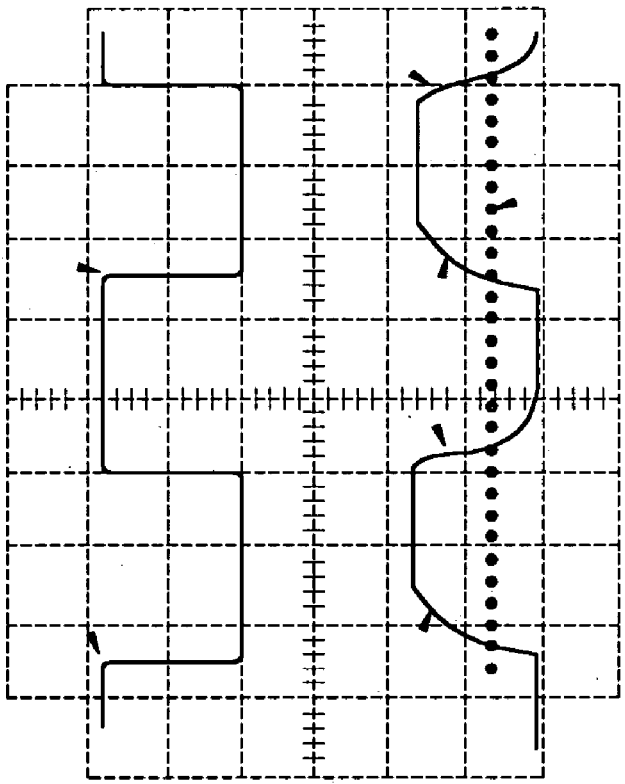
FIGS. 2A and 2B are views illustrating output transition characteristics of an N×M optical switch.
Figure 2B:
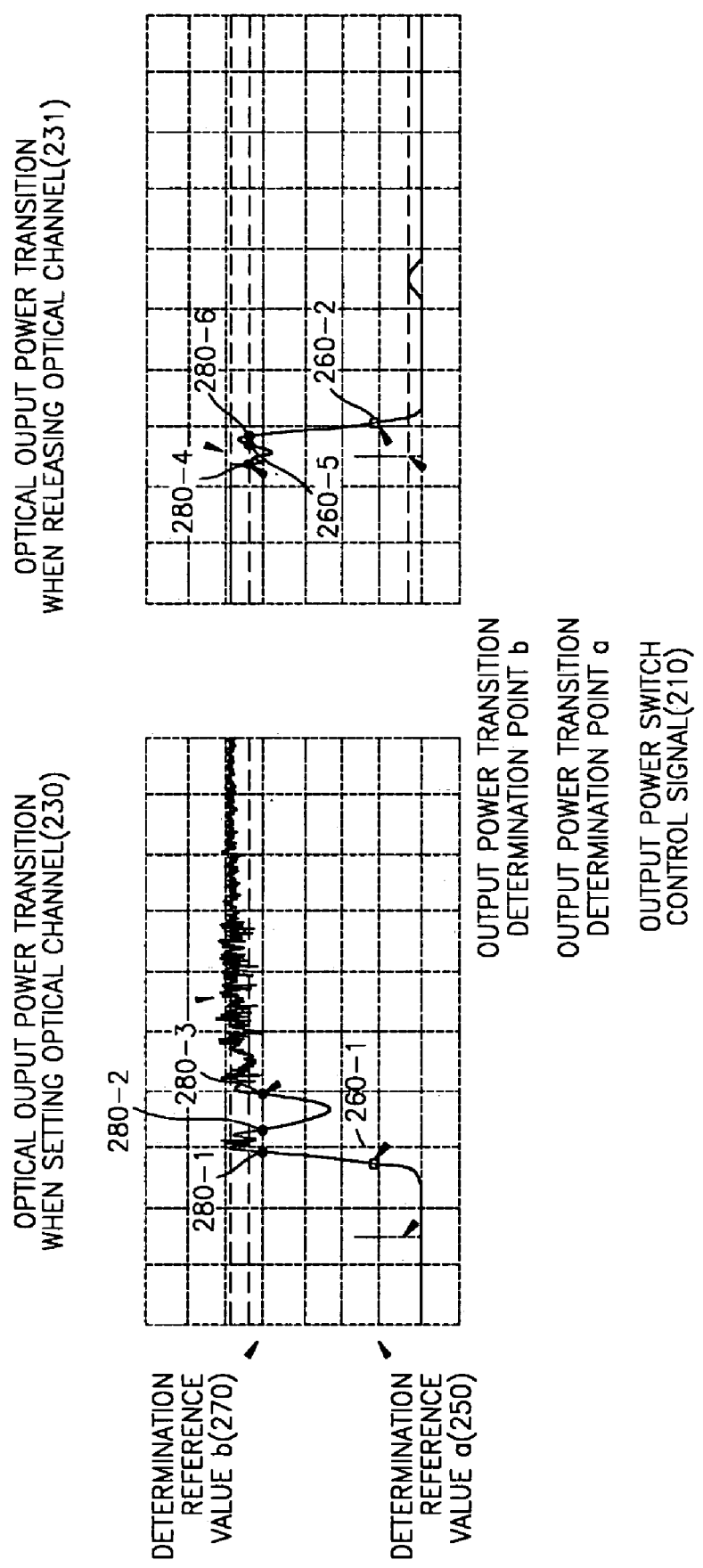

FIGS. 2A and 2B are views illustrating output power transition characteristics of an N×M optical switch. In other words, FIGS. 2A and 2B illustrate output power transitions of optical signals detected from output ports via set or released channels when the channels are set or released using N×M optical switches by different manufacturers.

When an optical channel is set or released so as to output an input optical signal to a specific output port under an optical switch control signal 210, output transitions 220 and 221 of the optical signal are detected from the specific output port. If the output transitions 220 and 221 pass an output transition determination reference value 240, it is determined that an optical output transition has occurred.

FIG. 2B is a view illustrating output transition characteristics of optical switches by different manufacturer. As shown in FIG. 2B, one or more output transitions may occur depending on the kind and characteristics of the optical switches. In FIG. 2B, when a reference value a 250 is used as an output transition determination reference, one-time of output transition 260-1 or 260-2 is respectively sensed in each of the optical switching. When a reference value b 270 is used as the output transition determination reference, three-times of output transitions 280-1 through 280-3 and 280-4 through 280-6 are sensed in each of the optical switching. In order to take considerations of case by case characteristic, one or odd times of output transitions are regarded as one-time of output transition within the switching time in consideration of the characteristics of he optical switches.

Figure 3:
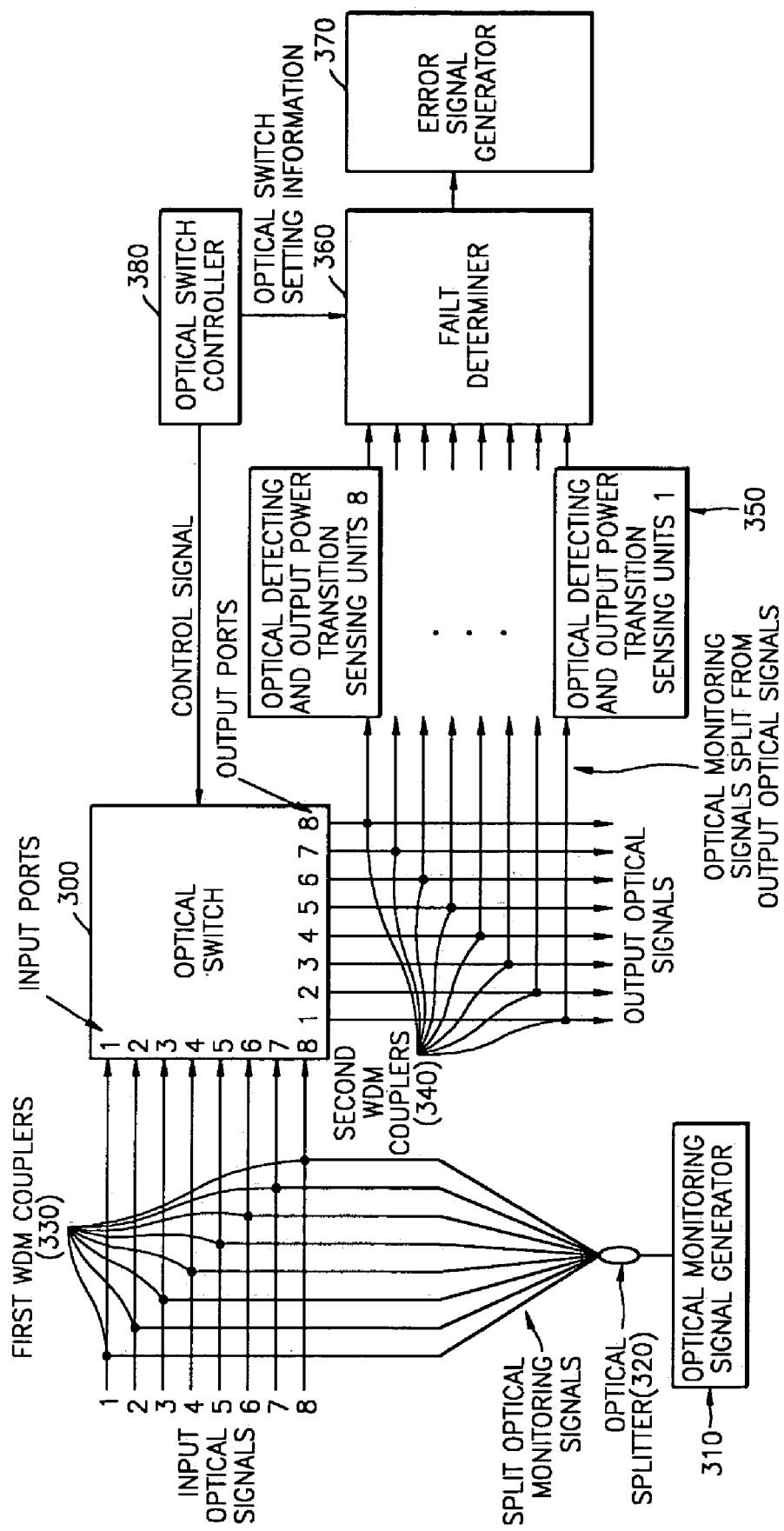
FIG. 3 is a block diagram of an apparatus for detecting the fault of an optical switch according to an embodiment of the present invention.

FIG. 3 is a block diagram of an apparatus for detecting the fault of an optical switch according to an embodiment of the present invention. Referring to FIG. 3, the apparatus includes an optical switch 300, an optical monitoring signal generator 310, an optical splitter 320, first wavelength division multiplexing (WDM) couplers 330, second WDM couplers 340, optical detecting and output transition sensing units 350, a fault determiner 360, an error signal generator 370, and an optical switch controller 380.

The optical switch 300 is an 8×8 optical MEMS switch for example. The optical monitoring signal generator 310 generates an optical monitoring signal used to monitor the optical switch 300. The generated optical monitoring signal has a different wavelength from the input optical signals of the optical switch 300. The optical monitoring signal generated by the optical monitoring signal generator 310 is split into eight optical monitoring signals by the optical splitter 320. The eight optical monitoring signals are optically connected to input optical fibers of the optical switch via the first WDM couplers 330, respectively, and input to the input ports 110.

Optical fibers connected to output ports of the optical switch 300 have eight second WDM couplers 340 that split the input optical monitoring signals from the coupled optical signals output from the output ports. The optical detecting and output transition-sensing units 350 detect output power transitions of the split optical monitoring signals. The fault determiner 360 compares the detected output power transitions of the optical monitoring signals with optical switch setting information received from the optical switch controller 380. The fault determiner 360 determines that the optical switch 300 normally operates if the detected output transitions of the optical monitoring signals coincide with the optical switch setting information. If not, the fault determiner 360 determines that the optical switch 300 operates abnormally. The error signal generator 370 generates an error signal when the optical switch 300 malfunctions.

The fault determiner 360 determines that the optical switch 300 malfunctions as follows:

(1) in a case where output transition(s) of any monitoring signals split from output ports is(are) detected under none of fresh switching control signal input to the optical switch 300.

(2) in a case where output transition(s) of the optical monitoring signals are detected from output ports in which switching must not occur or one or odd times of output transitions of the optical monitoring signals are not detected from output ports in which switching has to occur within a predetermined length of time when a fresh switching control signal is input to the optical switch 300. Here, the predetermined length of time is pertinent if it is 1.5 times the characteristic switching time of the optical switch 300.

(3) For reliable fault detections, only one of the input optical channels should be switched within the said predetermined length of time to avoid accidental cancelling of multiple malfunctions.

Also in the above-described case (2), it is not necessary to distinguish that the output transition corresponds to optical path setting or releasing. If the optical switch 300 receives a switching control signal for setting a specific optical channel and an output transition corresponding to optical channel releasing as 231 of FIG. 2B is detected from an output port of the specific optical channel, or the optical switch 300 receives a switching control signal for releasing the specific optical channel and an output transition corresponding to optical channel setting as 230 of FIG. 2B is detected from the output port of the specific optical channel, it means that an improper switching has been already carried out and it has already been detected according to (1) and (2).

Now the validity of the said fault detecting method will be considered. Since case (1) is obvious, all switch faults under none of fresh switching control signal inputting can be detected.

When inputting a fresh switching control signal according to condition (3), output transitions are always detected from the corresponding output port within the said predetermined time. Thus, the improper operation of the optical switch can be determined by detecting cases where output transitions of the optical monitoring signals occur in the output ports in which output transition must not occur or a case where output transition of the optical monitoring signal does not occur in the output port in which output transition has to occur within the said predetermined time. However, a malfunction probability of the said fault detecting method exists theoretically although it is very small.

Figure 4:
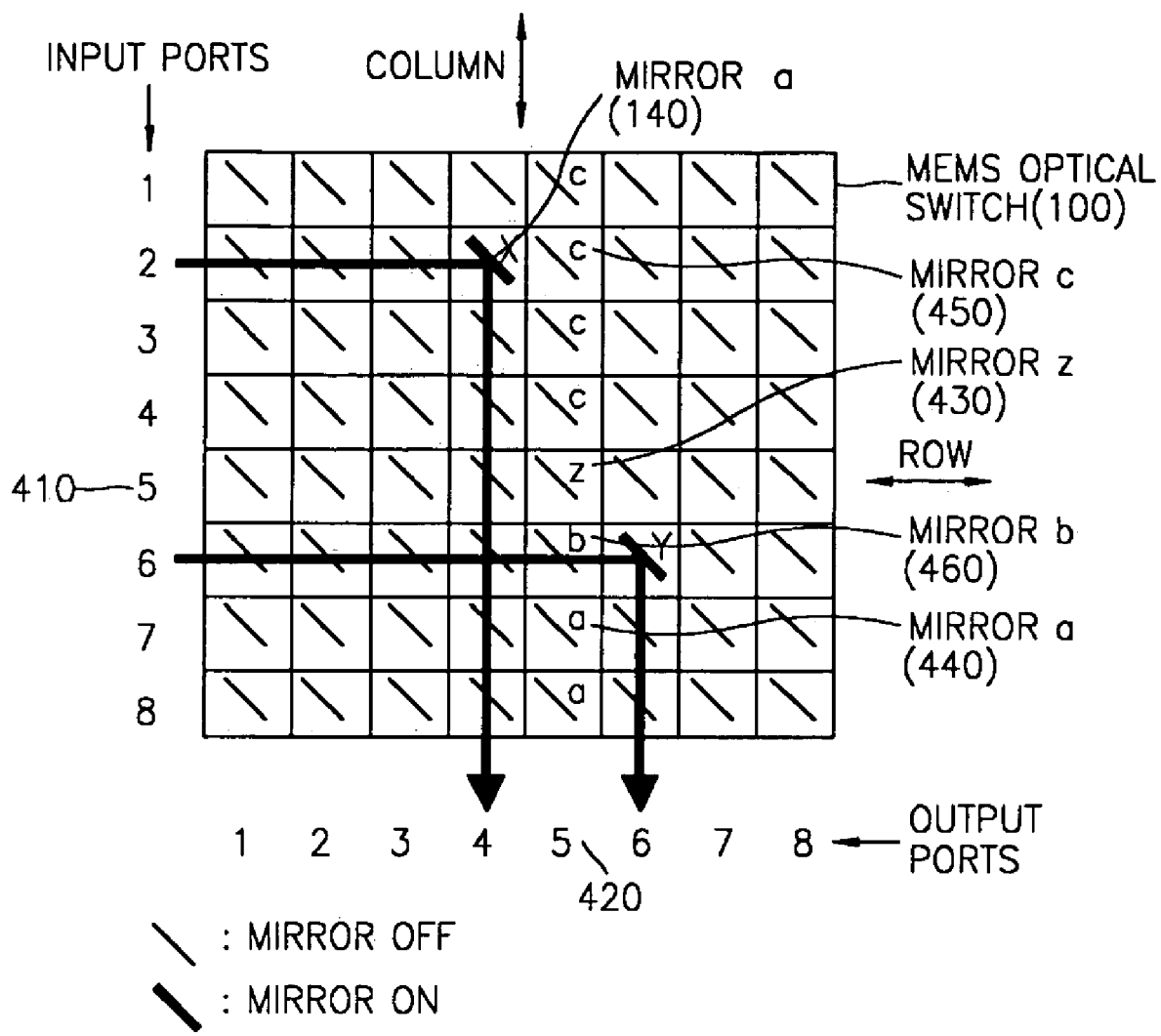
FIG. 4 is a view explaining a case where an optical switch is determined not to malfunction although the optical switch has malfunctioned.

FIG. 4 is a view explaining a case using a 8×8 optical MEMS switch where it is determined that the optical switch does not malfunction although the switch malfunctioned. Referring to FIG. 4, if a mirror z 430 is normally turned on to set a new optical channel connecting the number 5 input port 410 to the number 5 output port 420, an output transition has to be sensed from the number 5 output port 420. Here, if a control command is transmitted to a mirror in another row not the mirror z 430 or a mirror c 450 just next to a mirror x, no output transition is sensed from the number 5 output port 420. Thus, it is determined that the MEMS switch malfunctions.

If the control command is mistakenly transmitted to a mirror b 460, and thus the mirror b 460 is turned on, an output transition is detected from the number 6 output port in which an optical channel has already been set. Thus, it is determined that the MEMS switch malfunctions. Only if the control command is transmitted to a mirror a 440 or to some of the mirrors c in the same row of the mirror z 430 which do not interfere with the existing optical path, the output transition of the MEMS switch is determined not to be a fault. Therefore, the probability that the fault of the MEMS switch will not be detected is substantially much lower than the probability that the control command will be mistakenly transmitted.

An internal electronic circuit of optical switches transmitting the control command to the mirrors are composed of semiconductor devices such as complementary metal oxide silicon (CMOS) transistors, bipolar transistors, or the like, which are the same as the devices constituting the control units outside the MEMS switch. Thus, the probability that the control command will be mistakenly transmitted is similar to the probability that the control units will abnormally operate. Therefore, the probability that the said fault detection method malfunction is much lower than the probability that the control units will abnormally operate. So it is to be noted that the said weak point of the fault detecting method is ignorable in the actual fault detection of optical switches.

Figure 5:
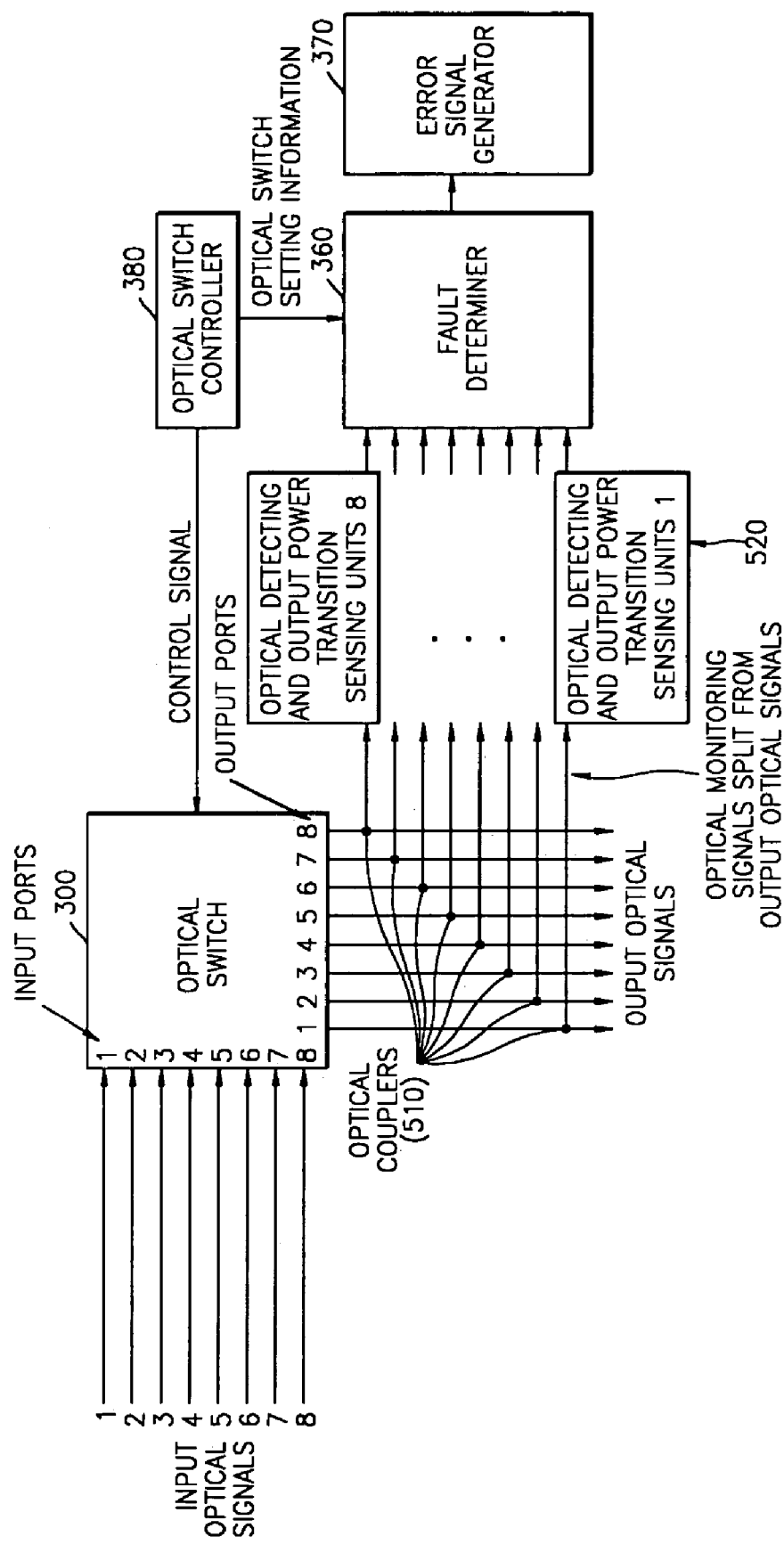
FIG. 5 is a block diagram of an apparatus, having no additional optical monitoring signal source, for detecting the fault of an optical switch according to another embodiment of the present invention.

FIG. 5 is a block diagram of an apparatus, having no additional optical monitoring signal generator, for detecting the fault of an optical switch, according to another embodiment of the present invention. Here, the optical monitoring signal generator 310 and the optical splitter 320 as shown in FIG. 3 are not used. Instead of the second WDM couplers 340, optical couplers 510 split some of input optical signals from output ports. Optical detecting and output transition sensing units 520 detect output transitions of the split output optical signals to check whether an optical switch 300 malfunctions. In this case, corresponding optical signals have to be input before optical channels are set and have to be maintained until the optical channels are released. However, since optical signals are not input to the unused input ports, practically all faults of the optical switch 300 can be detected. Here, it is preferable that the coupling efficiency of the optical couplers 510 for splitting output optical signals is 10% or less in order to minimize the influences on the optical signals.

Figure 6:
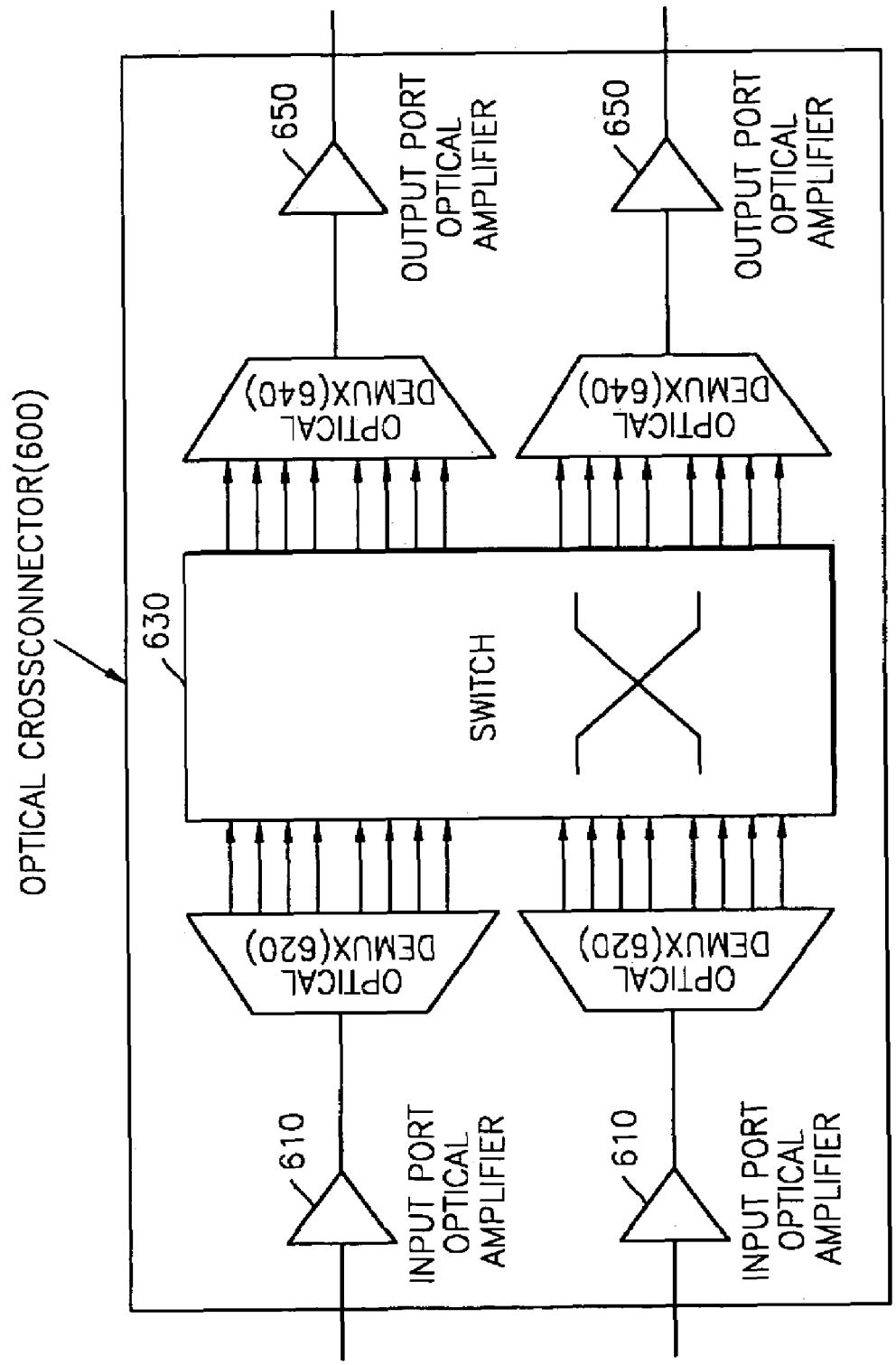
FIG. 6 is a view illustrating input and output ports of an optical cross-connector (OXC)

FIG. 6 is a view of input and output ports of an optical cross connect (OXC). Here, the OXC can use the apparatus shown in FIG. 5, having no additional optical monitoring signal generator, for detecting the fault of an optical switch. Referring to FIG. 6, amplified spontaneous emission (ASE) emitted from input port optical amplifiers 610 are input to input ports of a switch 630 via optical demultiplexers 620. Optical detecting and output transition sensing units may detect output transitions of the ASE using the ASE power as the optical monitoring signals.

Since usual optical couplers are used, coupled signals of the ASE and true optical signals are partially split and detected when the optical signals are input. But only the ASE power is partially split and detected when the optical signals are not input. Thus, the amplitude of the output transitions can be nearly 100 times different in the two cases. However, if the output transitions are determined based on the output transitions of the ASE power, little differences are obtained when determining the faults of the switch 630.

Figure 7:
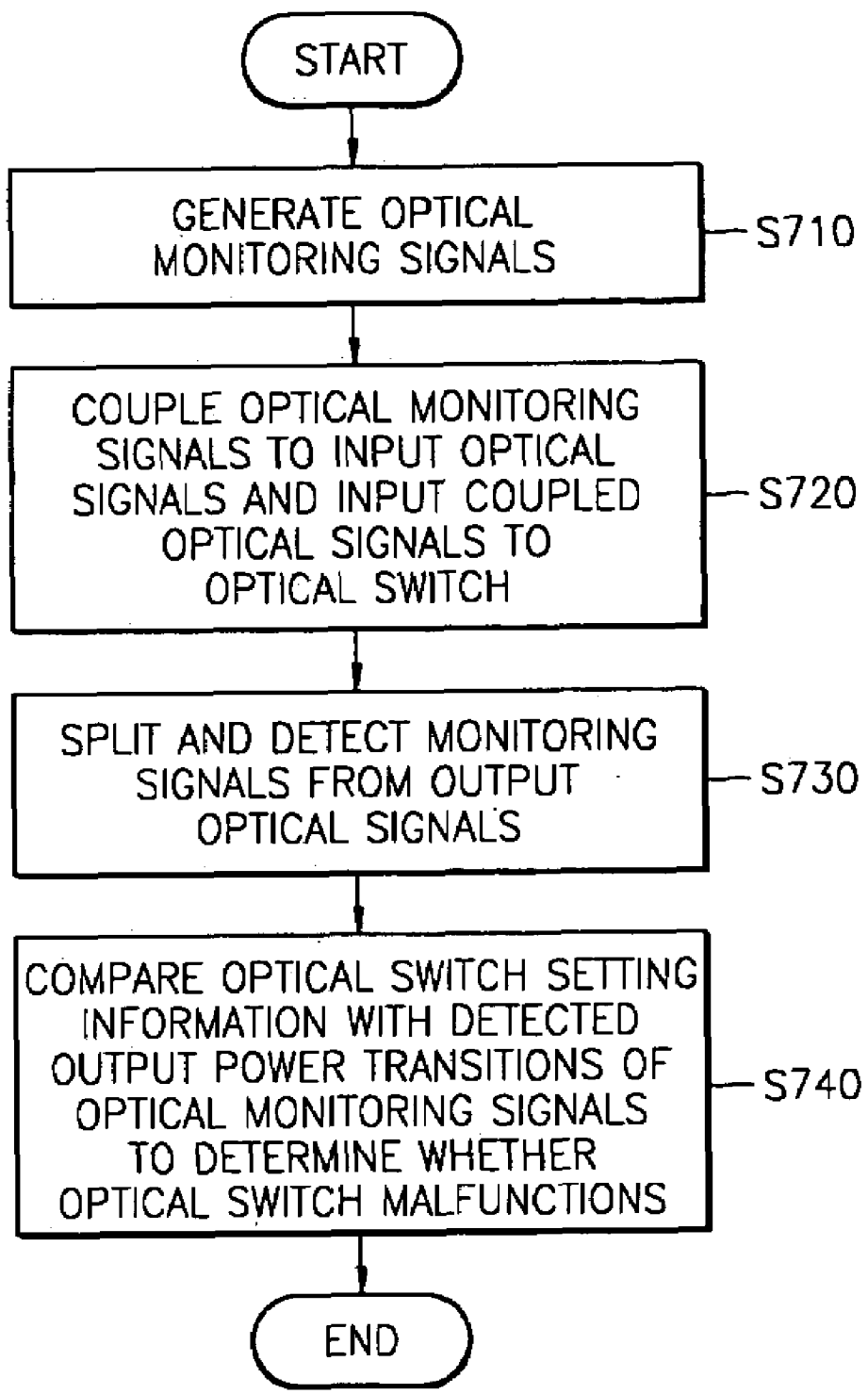
FIG. 7 is a flowchart of a method for detecting the fault of an optical switch according to an embodiment the present invention.

FIG. 7 is a flowchart of a method for detecting the fault of an optical switch using an additional optical monitoring signal generator, according to an embodiment of the present invention.

In step S710, optical monitoring signals that will be input to a plurality of input ports of the optical switch are generated apart from optical signals having data to be transmitted. In step S720, the optical monitoring signals are optically coupled to the optical signals having data to be transmitted, respectively, and then the coupled signals are input to the optical switch.

In step S730, the optical monitoring signals are split and detected from optical signals output from the optical switch. In step S740, the output transitions of the detected optical monitoring signals are compared with optical switch setting information, and it is determined whether the optical switch malfunctions depending on whether the output transitions of the optical monitoring signals coincide with the optical switch setting information. The apparatus for detecting the fault of an optical switch, which does not use an additional optical monitoring signal generator as shown in FIGS. 5 and 6, performs only steps S730 and S740.

As described above, in the present invention, an optical switch can be monitored without affecting transmission quality compared with a method of monitoring an optical switch of a conventional optical cross-connector by using tones. In addition, since additionally required optical module and electronic circuit are simple, the method can be easily applied to the optical cross-connector.

While the present invention has been particularly shown and described with reference to preferred embodiments thereof, it will be understood by those of ordinary skill in the art that various changes in form and details may be made therein without departing from the spirit and scope of the present invention as defined by the following claims.

What is claimed is:

1. An apparatus for detecting a fault of an optical switch, the apparatus comprising:
    a plurality of splitters that respectively split optical signals output from an optical switch to generate split optical signals;
    a plurality of optical detecting and output power transition sensing units that detect output power transitions of the split optical signals; and
    a fault determiner that receives information on setting the optical switch from an external source, compares the information with the detected output power transitions of the split optical signals, and determines whether the optical switch malfunctions depending on whether the information coincides with the detected output power transitions of the split optical signals, wherein the fault determiner determines, within a predetermined length of time after a fresh switching control signal is input to the optical switch, the optical switch malfunctions when an odd number of output transitions of one of the split optical signals are not detected from an output port of the optical switch in which switching has occurred.

2. The apparatus of claim 1, further comprising an error signal generator that generates an error signal corresponding to a fault-determining signal received from the fault determiner.

3. The apparatus of claim 1, wherein the plurality of optical detecting and output power transition sensing units detect output transitions of amplified spontaneous emission signals generated by optical amplifiers positioned at input ports of optical switching systems such as optical cross-connectors.

4. The apparatus of claim 1, wherein the fault determiner receives information on setting the optical switch from an external source, compares the information with the detected output transitions of the split optical signals or output transitions of the amplified spontaneous emission signals, and determines whether the optical switch malfunctions depending on whether the switch setting information coincides with the detected output transitions of the split optical signals or the output transitions of the amplified spontaneous emission signals.

* * * * *